May 23, 1967 R. SCHNEIDER ET AL 3,321,282
VESSEL SUBDIVIDED BY PARTITIONS INTO SEVERAL CELLS
TRANSVERSELY TO ITS LONGITUDINAL AXIS
Filed May 11, 1965 4 Sheets-Sheet 1

INVENTORS:
RUDOLF SCHNEIDER, OTTO COURT.

BY Burgess, Dinklage & Sprung

ATTORNEYS

INVENTORS:
RUDOLF SCHNEIDER, OTTO COURT.

INVENTORS:
RUDOLF SCHNEIDER, OTTO COURT.
BY
Burgess, Dinklage & Sprung
ATTORNEYS United States Patent Office 3,321,282
Patented May 23, 1967

3,321,282
VESSEL SUBDIVIDED BY PARTITIONS INTO SEVERAL CELLS TRANSVERSELY TO ITS LONGITUDINAL AXIS
Rudolf Schneider, Krefeld-Bockum, and Otto Court, Neuss, Germany, assignors to Farbenfabriken Bayer Aktiengesellschaft, Leverkusen, Germany, a corporation of Germany
Filed May 11, 1965, Ser. No. 454,845
Claims priority, application Germany, May 12, 1964, F 42,854
1 Claim. (Cl. 23—273)

The invention relates to a vessel which is subdivided by partitions in to several cells transeversely to its longitudinal axis and which is externally heated or cooled, into which liquid which only partly fills the vessel is introduced at one end and conducted away at the other end, which vessel is equipped with a stirring mechanism to which stirrer blades rotating in the individual cells are attached. For carrying out continuous, multi-stage evaporations or reactions, so-called stirrer cascades are known in which the liquid to be treated flows from one tank to another situated below it. In addition, cascade reactors are known which consist of a horizontal cylinder the lower part of which is equipped with partitions. In the subdivided vessels of this known kind, the intermediate spaces are provided with passages or overflows to enable the cascade effect to be produced.

In vessels of this kind, only a relatively small surface is available to the liquid for evaporation and the vapours have to ascend in the form of bubbles against the static pressure.

For substances which are sensitive to temperature, there are serious disadvantages in such cascade vessels because the time of stay in such vessels is very great and the volumetric content during operation is always disadvantageously high in proportion to the throughput owing to the required heat exchange surface.

Evaporators are also known in which the liquid trickles in a thin layer down the inner wall of a heated cylinder and a liquid film of a thickness of about $\frac{1}{10}$ to several mm. is maintained by either fixed or movable wipers.

The time of stay is in the region of a few seconds to about half a minute and thus much better than in tank cascades.

The apparatus requires a minimum load because otherwise part of the heating surface is not wetted so that the product may be damaged by overheating or residues may cake to the surface of the vessel.

As is well known, the time of stay of the undistilled part of the product can be altered by attaching a baffle ring to the lower end of this evaporator, where it forms a liquid surface in the form of a paraboloid of rotation depending on the speed of rotation of the shaft of the wipers.

The installation of several baffle rings in a multi-stage arrangement one behind the other in the evaporator is disadvantageous because the rings make it difficult or impossible to install and dismantle the wiper or stirrer construction.

It has been found that the above mentioned disadvantages can be obviated and the time of stay in the individual cells of the vessel can be rendered adjustable if the partitions are constructed according to the invention as rings which are attached at their outer circumference to the inner wall of the vessel and provided on their inner circumference with at least one incision which serves as overflow dam for the ring of liquid which forms between the rings on the inner wall of the vessel when the stirring mechanism is in rotation.

By making the thickness of the ring of liquid adjustable, a quantity of material in the apparatus during operation and hence also its time of stay are also rendered adjustable. The incisions may be adjustable in depth. The thickness of the ring of liquid formed on the wall of the vessel in each cell by the centrifugal force when the stirrer rotates can thus be adjusted as desired. This is of great practical importance because the plant can immediately resume operation without any need to wait until the apparatus in continuous operation has attained its equilibrium state. The adjustability of the quantity of the contents during operation or of the time of stay is especially advantageous in the stepwise distillation of liquids or the stepwise carrying out of chemical reactions in which vapours and gases are supplied or in which the corresponding gases or vapours are removed, for example in operations carried out in vacuo.

In chemical reactions which have to be carried out with the aid of solid pulverulent catalysts which tend to form deposits, blocking of the apparatus is safely avoided by the stirrers rotating in the cells.

By arranging the dams in the upper port of the annular walls, idling of the individual cells during stand-still of the stirrer is prevented if the reactor is arranged horizontally.

To prevent backflow of the liquid against the direction of through-flow from one cell to the next, the overflow edges of the incisions in the annular walls are arranged at increasing distances from the axis of the vessel from one annular wall to the next.

To prevent spraying from one cell to another, spray discs are arranged on the shaft of the stirrer on each side of each ring.

The wiper elements which maintain the rotating ring of liquid in the individual cells are arranged to be eccentrically rotatable so that when folded back, they can be introduced through the opening of the partitions and then folded into the operative position and fixed in position from the front end.

Movable wipers are preferably also arranged to be eccentrically rotatable; they become operative by centrifugal force.

The liquid film can be influenced by the form of the wipers. The wipers may be comb-shaped, saw-toothed or blade shaped.

The partitions may be so formed that they influence the flow conditions within a cell. Rounding off the edges increase the mixing by backflow and hence results in better working through of the product.

Embodiments of the invention are shown schematically by way of example in the drawing.

Figure 1:
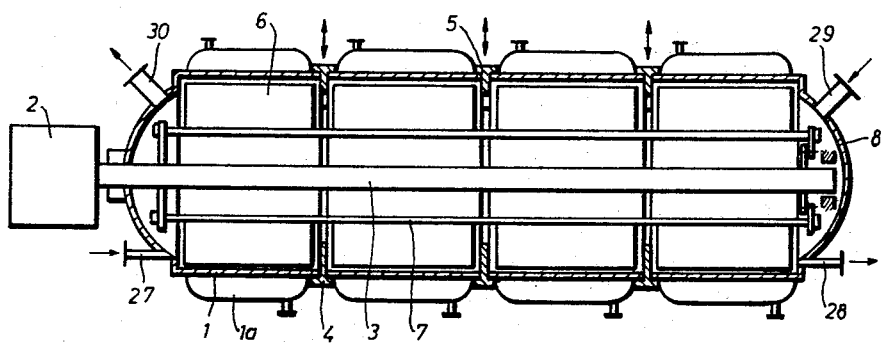
FIG. 1 is a longitudinal section through a cascade reactor.
Figure 2:
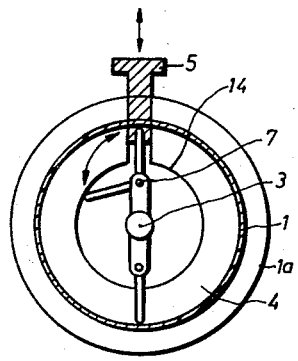
FIG. 2 is a cross-section through this reactor.

FIGS. 1 and 2 show the essential components of the cascade reactor. The heating zones of the reaction tube 1 are heated or cooled from outside by means of the jackets 1a, and the different stags of the cascade may be operated either separately or all together.

A shaft 3 carrying the stirrer attachment is driven by a motor 2. The reaction tube 1 is subdivided, e.g. into four stages, by the partitions 4 to regulate the thickness of the film developing on the inside wall of the vessel 1. A liquid film which exceeds the height of the dam measured from the inside wall of vessel 1 will flow from one stage into an adjacent stage in the direction of liquid flow. Adjustable dams 5 are built into the partitions 4. Wiper blades 6 are rotatably attached to several rods 7 which extend parallel to the shaft 3. The wiper blades 6 are swingable with these rods so that when they are folded back they can be introduced into the individual cells of the container to be then folded back into the operative position and fixed in that position either before the cover 8 is attached or by manipulation through an aperture (FIG. 2). The liquid to be treated is introduced into the reactor 1 through the connection 27 and leaves the reactor through the outflow 28. The gases or vapours are introduced through the short tube 29 and removed through the short tube 30 or conversely. If desired, the wipers may be arranged to be individually movable in hinges about the rods 7.

Figure 3:
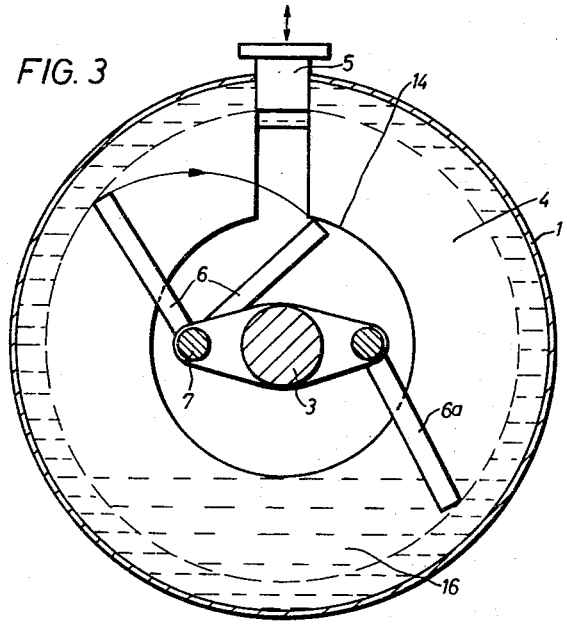
FIG. 3 is a cross-section through the reactor on an enlarged scale.

In FIG. 3, the dam 5 is shown as a bolt. In order to be able to move the stirrer easily inside the boundary 14 of the partition 4, the blades 6 and 6a are mounted to be swingable about the rods 7. The blade 6 is shown both in its operative position and folded down. The level of liquid when the plant is at a standstill is indicated at 16.

Figure 4:
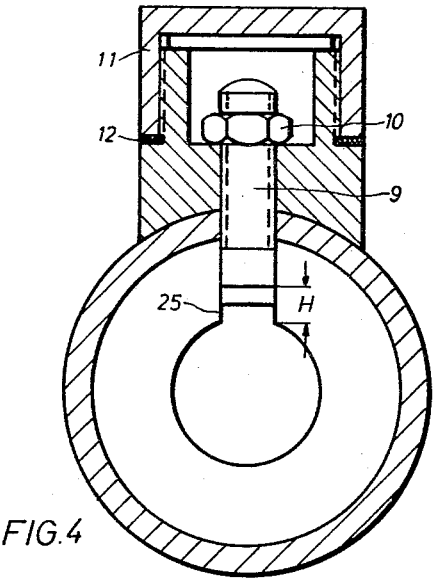
FIGS 4 and 5 illustrate the possibilities of adjustment of the dimensions in the partitions.
Figure 5:
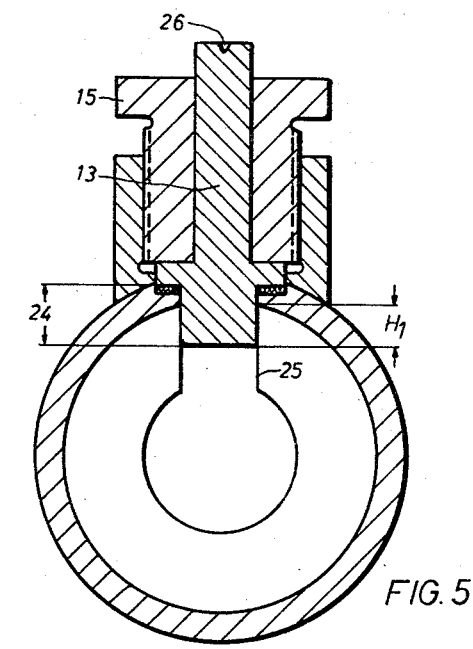

FIG. 4 shows the adjustability of the dams. The height H of the dams can be adjusted by means of a screw-threaded bolt 9. The bolt 9 is stopped by means of a nut 10. The reactor is sealed by a screw cap 11 and seal 12. FIG. 5 shows a technically simpler solution; in this case, the bolt 13 which determines the height $H_1$ of the dam is clamped in position by a screw connection 15. The displacement of the bolt is indicated by a marking 26. The film of liquid can be throttled by turning the bolt 13. Altering the flat bolt attachment 24 extending into a slot 25 also produces an alteration in the height of the dam.

Figure 6:
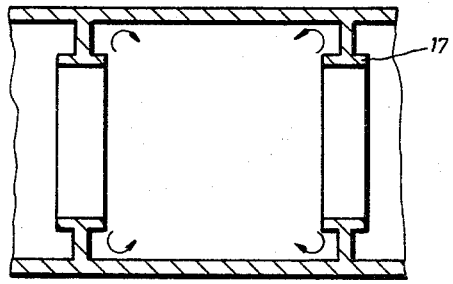
FIGS. 6, 7 and 8 show various embodiments of the partitions in cross-section.
Figure 7:
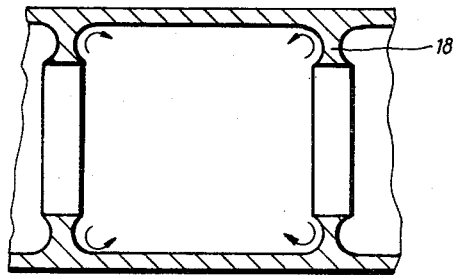
Figure 8:
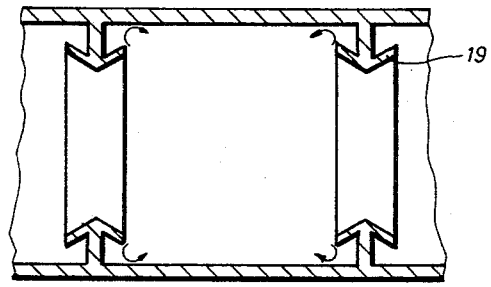

FIGS. 6, 7 and 8 show different constructions of the end surfaces of the annular partitions. They may be parallel to the axis as shown at 17, or rounded off as at 18, or set at a particular angle as indicated at 19, in order to impart a certain direction to the flow of liquid in the individual chambers (see arrow).

Figure 9:
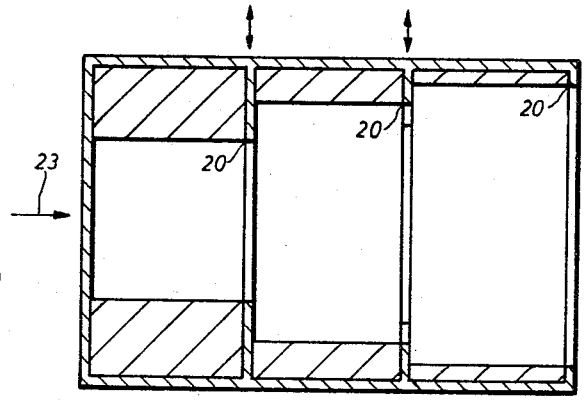
FIGS. 9, 10 and 11 are longitudinal sections through reactors with liquid rings of different thicknesses.
Figure 10:
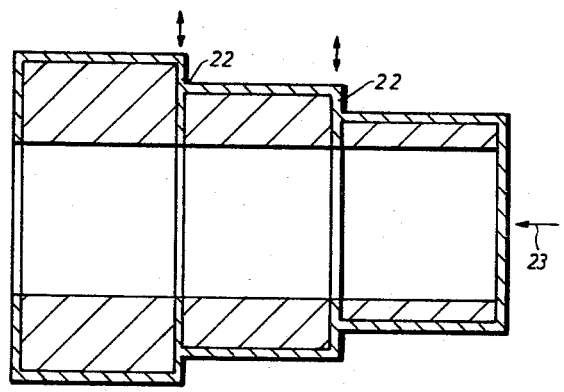
Figure 11:
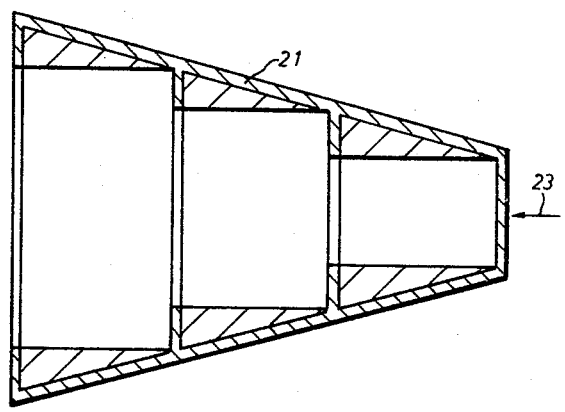

FIGS 9, 10 and 11 illustrate how back mixing in the direction of throughflow can be prevented in reactor vessels. The distance of the overflow edge of the dam 20 from the axis of the apparatus increases from cell to cell in the direction of throughflow (arrow 23). The same effect is achieved by making the reactor 21 conical. In addition, the quantity contained in the reactor during operation can be varied by stepping the individual cells 22.

We claim:

Vessel subdivided by partitions into several cells transversely to its longitudinal axis and externally tempered, said vessel having an inlet and an outlet in which a liquid only partly filling the vessel is introduced at one end and conducted away at the other end, said vessel being equipped with a stirring mechanism to which rotating stirrer means having eccentrically mounted blades are attached in the individual cells, said partitions being constructed in the form of rings which are attached with their outer surfaces to the inner wall of said vessel and provided with an opening having an adjustable overflow dam therein arranged to control the depth of a ring of liquid which forms on the inner wall of said vessel between the rings when said stirring mechanism rotates.

References Cited by the Examiner

UNITED STATES PATENTS

| 1,420,648 | 6/1922 | Mabee | 159—6 |
| 2,845,936 | 8/1958 | Boynton | 23—270 |
| 3,115,894 | 12/1963 | Marx | 137—576 |
| 3,183,112 | 5/1965 | Gemassmer | 159—6 |

NORMAN YUDKOFF, *Primary Examiner.*

G. HINES, *Assistant Examiner.*